June 19, 1951     H. SHONBERG     2,557,574
SOLDER PACKAGE
Filed May 5, 1948
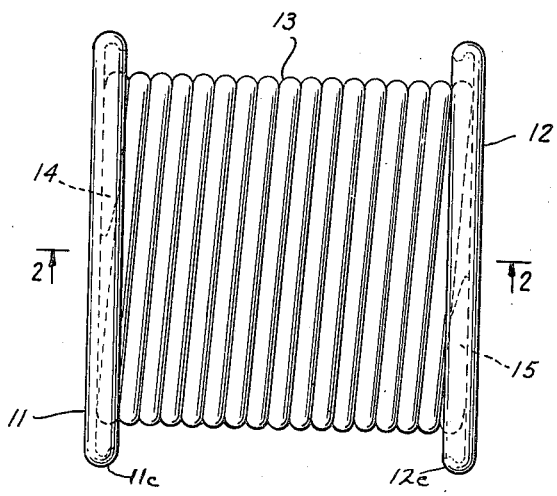
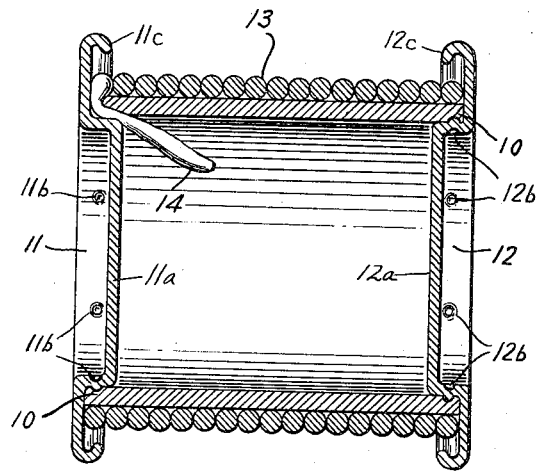
INVENTOR.
HAROLD SHONBERG
BY
*his* ATTORNEYS.

Patented June 19, 1951

2,557,574

UNITED STATES PATENT OFFICE 2,557,574

SOLDER PACKAGE

Harold Shonberg, Brooklyn, N. Y., assignor to Alpha Metals, Inc., Brooklyn, N. Y., a corporation of New York Application May 5, 1948, Serial No. 25,168

2 Claims. (Cl. 206—59)

The present invention relates to methods of packaging materials such as wire solder and the like and to the resulting package.

It has been the practice to sell packings of wire solder consisting usually of a spool around which are wrapped a number of turns of the solder. Inasmuch as the solder is easily deformed and is retained on the spool only by being bent around the spool, the solder is easily loosened so that the loops loosen and pile up on top of each other. The package then presents an unattractive appearance, and, moreover, it is less readily saleable for the reason that it appears to have less than the expected amount of solder in it.

It is an object of this invention to provide a new and improved package for wire solder and the like in which the solder is retained in a tightly wound condition on the spool even if roughly handled.

Another object of the invention is to provide a method of packaging wire solder and the like to provide an attractive and saleable package in which the turns of wire solder are anchored against inadvertent displacement.

In accordance with the invention, the solder wire or other flexible material is wrapped helically around a core member, such as a paper board tube of suitable length and diameter and the free opposite ends of the wire are bent over and into the interior of the core member. This core member forms the body of a spool having end plates which are detachably mounted at the ends of the core. The end plates are provided with cylindrical bosses which fit into the ends of the hollow core member. When the bosses on the end plates are pressed into the ends of the core, the inturned ends of the solder wire are firmly gripped so that the turns of wire are firmly retained on the spool.

The invention may be better understood from the following detailed description taken in conjunction with the accompanying drawings, in which:

Figure 1 is a view in front elevation of a holder constructed in accordance with the present invention; and Figure 2 is a view in longitudinal section of the holder shown in Figure 1, taken on line 2—2.

Referring now to Figures 1 and 2, a typical package includes a tubular core member 10 made up of any suitable material, such as paper board or other inexpensive material. The core member 10 is assembled with the end plates 11 and 12, which are provided with centrally located bosses 11a and 12a, so formed as to fit tightly into the opposite ends of the member 10. If desired, the bosses 11a and 12a may be provided with punched out portions 11b and 12b for more firmly securing the end plates to the core member. Also, the peripheries of the end plates 11 and 12 may be bent over as at 11c and 12c to overlie the end of the core.

The wire solder 13 or other flexible material is helically wrapped around the core member 10 to provide one or more layers of the solder 13. When an odd number of layers are wound on the core member, the free ends 14 and 15 of the solder are bent over the opposite ends of the core 10 into its interior and the end plates 11 and 12 are then pressed into position to complete the spool and also grip the ends of the solder wire between the bosses and the inner surface of the core. In this way, the solder wire 13 is effectively retained on the spool and displacement of the turns of wire is prevented. If an even number of layers is on the core member, both ends of the solder will be bent over the same end of the core. The bent over edges 11c and 12c of the spool ends aid in holding the end turns of the solder in place and in some instances may be sufficient to prevent displacement of the solder.

As much of the solder as required may be removed by the purchaser at any time, by pulling out an end plate and unwinding a part of the solder. After a piece of the solder is removed, the free end of the solder remaining on the core may be bent into the core and the end plates replaced to again retain the solder firmly on the spool.

While the invention has been described with reference to solder as the material being packaged, it will be understood that other flexible materials, such as wire or cord, may be packaged in a similar way. It will also be understood that the shape and size of the core member 10 and the ends plates 11 and 12 may be modified as required, and that the bosses on the end plates may be changed to flanges or lugs if desired.

The modification described in detail above is intended to be merely illustrative only and the invention is not intended to be limited in any way thereby but is susceptible of numerous changes in form and detail within the scope of the following claims.

I claim:

1. A wire solder package comprising a hollow core member, at least one layer of wire solder wrapped around said member and having its ends bent over the adjacent end of said member and into its interior, a pair of removable end plates having bosses extending into said hollow core member in tight frictional engagement therewith, the said end plates engaging the respective ends of said solder and anchoring said ends within the hollow core member.

2. A wire solder package comprising a hollow core member, at least one layer of wire solder wrapped around said member and having each end bent over the adjacent end of said member and into its interior, a pair of removable end plates having bosses extending into said hollow core member in tight frictional engagement therewith, each end of said wire solder being engaged and anchored within the hollow core member by an end plate at the end of the core member over which the respective end of the wire solder is bent.

HAROLD SHONBERG.

REFERENCES CITED

The following references are of record in the file of this patent:

UNITED STATES PATENTS

| Number | Name | Date |
| --- | --- | --- |
| 885,517 | Prescott | Apr. 21, 1908 |
| 1,256,278 | Takeuchi | Feb. 12, 1918 |
| 1,923,456 | Price | Aug. 22, 1933 |